United States Patent
Meggiolan

(10) Patent No.: US 8,066,293 B2
(45) Date of Patent: Nov. 29, 2011

(54) ASSEMBLY OF BICYCLE COMPONENTS IN MUTUAL ROTATION AND BICYCLE COMPRISING SUCH AN ASSEMBLY

(75) Inventor: Mario Meggiolan, Creazzo (IT)

(73) Assignee: Campagnolo S.R.L., Vicenza (IT)

( * ) Notice: Subject to any disclaimer, the term of this patent is extended or adjusted under 35 U.S.C. 154(b) by 347 days.

(21) Appl. No.: 12/422,657

(22) Filed: Apr. 13, 2009

(65) Prior Publication Data

US 2009/0261553 A1    Oct. 22, 2009

(30) Foreign Application Priority Data

Apr. 17, 2008  (EP) .................................... 08425259

(51) Int. Cl.
*B62M 1/02* (2006.01)
(52) U.S. Cl. ...................................... 280/259; 280/219
(58) Field of Classification Search .................. 280/219, 280/221, 259
See application file for complete search history.

(56) References Cited

U.S. PATENT DOCUMENTS

| | | |
|---|---|---|
| 529,110 A | 11/1894 | Copeland |
| 535,706 A | 3/1895 | Luther |
| 590,695 A | 9/1897 | Alcorn |
| 593,562 A | 11/1897 | Brennan |
| 594,109 A | 11/1897 | Weed et al. |
| 596,846 A | 1/1898 | Brown |
| 602,049 A | 4/1898 | Beard |
| 648,077 A | 4/1900 | Ludlow |
| 658,624 A | 9/1900 | Egger |
| 846,239 A | 3/1907 | Osborne |
| 951,137 A | 3/1910 | Lowrance |
| 1,235,530 A | 7/1917 | Jones |
| 1,449,235 A | 3/1923 | Lewis |
| 2,136,125 A | 11/1938 | Delaval-Crow |
| 3,306,101 A | 2/1967 | Holderer |
| 3,347,112 A | 10/1967 | Thun |
| 3,578,829 A | 5/1971 | Hata et al. |
| 3,888,136 A | 6/1975 | Lapeyre |

(Continued)

FOREIGN PATENT DOCUMENTS

CN    1522929    8/2004

(Continued)

OTHER PUBLICATIONS

"A Folding MWB Two-Wheeled Recumbent", Nick Abercrombie Andrews. Human Power, spring-summer 1994, 11(2), pp. 18-21.

(Continued)

*Primary Examiner* — Paul N Dickson
*Assistant Examiner* — Tashiana Adams
(74) *Attorney, Agent, or Firm* — Volpe and Koenig, P.C.

(57) ABSTRACT

The invention relates to an assembly (1) of bicycle components in mutual rotation, like for example a bottom bracket assembly. The assembly of the present invention comprises a support element (15), a rotary element (5) rotatably coupled with the support element (15) and at least one bearing (20) arranged between the support element (15) and the rotary element (5). The bearing (20) comprises at least one bearing element (30, 40) firmly coupled with one from the support element (15) and the rotary element (5). The bearing element (30, 40) and the element (5, 15) with which it is firmly associated have, at respective mutually coupled interface surfaces (36, 38, 42, 44), a standard reduction potential difference lower than or equal to 0.3 V, in absolute value.

20 Claims, 4 Drawing Sheets

U.S. PATENT DOCUMENTS

| | | | |
|---|---|---|---|
| 3,906,811 A | 9/1975 | Thun | |
| 4,093,325 A * | 6/1978 | Troccaz | 384/544 |
| 4,208,763 A | 6/1980 | Schroder | |
| 4,300,411 A | 11/1981 | Segawa | |
| 4,331,043 A | 5/1982 | Shimano | |
| 4,406,504 A | 9/1983 | Coenen et al. | |
| 4,704,919 A | 11/1987 | Durham | |
| 5,067,370 A | 11/1991 | Lemmens | |
| 5,243,879 A | 9/1993 | Nagano | |
| 5,493,937 A | 2/1996 | Edwards | |
| 5,624,519 A | 4/1997 | Nelson et al. | |
| 5,819,600 A | 10/1998 | Yamanaka | |
| 5,907,980 A | 6/1999 | Yamanaka | |
| 5,984,528 A | 11/1999 | Ohtsu | |
| 6,014,913 A | 1/2000 | Masahiro | |
| 6,116,114 A | 9/2000 | Edwards | |
| 6,192,300 B1 | 2/2001 | Watarai et al. | |
| 6,443,033 B1 | 9/2002 | Brummer et al. | |
| 6,564,675 B1 | 5/2003 | Jiang | |
| 6,581,494 B2 | 6/2003 | Sechler | |
| 6,790,535 B2 * | 9/2004 | Nishimura et al. | 428/457 |
| 6,829,965 B1 | 12/2004 | Mombrinie | |
| 6,886,676 B2 | 5/2005 | Von Levern et al. | |
| 6,938,516 B2 | 9/2005 | Yamanaka | |
| 6,983,672 B2 | 1/2006 | Smith | |
| 7,258,041 B2 | 8/2007 | Yamanaka et al. | |
| 7,267,030 B2 | 9/2007 | French | |
| 7,503,239 B2 * | 3/2009 | Yamanaka | 74/594.1 |
| 7,798,724 B2 * | 9/2010 | Van De Sanden et al. | 384/492 |
| 2001/0015390 A1 * | 8/2001 | Hitomi et al. | 242/322 |
| 2002/0081052 A1 | 6/2002 | Chi | |
| 2002/0096015 A1 | 7/2002 | Smith | |
| 2003/0006113 A1 | 1/2003 | Terada et al. | |
| 2003/0097901 A1 | 5/2003 | Yamanaka | |
| 2004/0162172 A1 | 8/2004 | Yamanaka et al. | |
| 2005/0011304 A1 | 1/2005 | Chiang | |
| 2005/0016323 A1 | 1/2005 | Dal Pra' | |
| 2005/0040699 A1 | 2/2005 | Chiang et al. | |
| 2005/0081678 A1 | 4/2005 | Smith et al. | |
| 2005/0217417 A1 | 10/2005 | Uchida et al. | |
| 2006/0103106 A1 | 5/2006 | Schlanger | |
| 2006/0112780 A1 | 6/2006 | Shiraishi et al. | |
| 2006/0288819 A1 | 12/2006 | Dal Pra' et al. | |
| 2007/0137426 A1 | 6/2007 | Meggiolan et al. | |
| 2007/0151410 A1 | 7/2007 | Meggiolan | |
| 2007/0204722 A1 * | 9/2007 | Dal Pra | 74/594.1 |
| 2007/0207631 A1 * | 9/2007 | Meggiolan et al. | 439/55 |
| 2007/0283781 A1 | 12/2007 | Meggiolan | |
| 2008/0124018 A1 | 5/2008 | Tanke et al. | |
| 2009/0145262 A1 | 6/2009 | Pasqua et al. | |
| 2009/0261553 A1 | 10/2009 | Meggiolan | |
| 2011/0049834 A1 * | 3/2011 | Natu | 280/279 |

FOREIGN PATENT DOCUMENTS

| | | |
|---|---|---|
| DE | 012 57 613 | 12/1967 |
| DE | 023 59 437 | 6/1975 |
| DE | 297 15 373 U1 | 8/1998 |
| DE | 200 03 398 | 5/2000 |
| EP | 0 756 991 A2 | 8/1996 |
| EP | 0 924 318 | 6/1999 |
| EP | 1 120 336 | 8/2001 |
| EP | 1 342 656 A2 | 9/2003 |
| EP | 1 342 656 A3 | 9/2003 |
| EP | 1 449 760 A2 | 8/2004 |
| EP | 1 659 057 | 5/2006 |
| EP | 1 661 803 | 5/2006 |
| EP | 1 726 517 | 11/2006 |
| EP | 1 726 518 | 11/2006 |
| EP | 1 759 981 A2 | 3/2007 |
| EP | 1 759 981 A3 | 3/2007 |
| EP | 1 792 818 | 6/2007 |
| EP | 1 792 821 | 6/2007 |
| EP | 1 820 726 | 8/2007 |
| FR | 0 623 094 | 6/1927 |
| FR | 0 863 610 | 4/1941 |
| FR | 0 934 104 | 5/1948 |
| FR | 2 801 863 | 6/2001 |
| FR | 2 870 508 | 11/2005 |
| GB | 2315776 | 2/1998 |
| JP | 05319349 | 12/1993 |
| JP | 0924318 | 6/1999 |
| JP | 11225633 | 8/1999 |
| WO | 01/63134 | 8/2001 |
| WO | 02/32751 A2 | 4/2002 |
| WO | 2005/058682 | 6/2005 |

OTHER PUBLICATIONS http://web.archive.org/web/20050210021901/http://pardo.net/bike/pic/fail-005/000.html.

Isis Drive Standard Committee, (Copyright 2001), *The International Spline Interface Standard*, (18 pgs.).

* cited by examiner

ASSEMBLY OF BICYCLE COMPONENTS IN MUTUAL ROTATION AND BICYCLE COMPRISING SUCH AN ASSEMBLY

FIELD OF INVENTION

The present invention relates to an assembly of bicycle components in mutual rotation.

BACKGROUND

Throughout the present description and in the subsequent claims, the expression "assembly of bicycle components in mutual rotation", is used to indicate any bicycle assembly defined at two bicycle components assembled together so that, during pedalling, they can rotate with respect to one another. Such an assembly therefore comprises at least one support element, at least one rotary element supported in rotation by the support element and at least one member arranged between the support element and the rotary element to allow the relative rotation of one element with respect to the other element. Examples of such an assembly are a bottom bracket assembly, a hub assembly or a steering assembly.

The invention also relates to a bicycle comprising the aforementioned assembly. Preferably, such a bicycle is a racing bicycle.

In the field of bicycles, above all in racing bicycles, the problem of the smoothness capability of those components that, during pedalling, are in mutual rotation has always been researched. This has been done as part of the continuing search to improve the bicycle performance.

Typically, the rotation of one component with respect to another in bottom bracket assemblies, or in hubs or in steering tubes, of bicycles is achieved through the use of rolling bearings.

In the past it has been observed that the initial smoothness capability of bicycle components assembled together and in relative rotation decreased over time, until it substantially reduces after a certain time; this phenomenon was due essentially to the accumulation on the bearings of atmospheric and/or polluting agents.

In order to limit this phenomenon, in racing bicycles nowadays ball bearings are used to which insulating grease is applied; indeed, the grease hinders the formation of corrosion. In order to hold the grease and therefore protect the inside of the bearings from the undesired action of atmospheric and/or polluting agents, special protective screens are used.

Despite the aforementioned provisions, a decrease in the time of smoothness capability of the bicycle components is still observed.

The technical problem at the basis of the present invention is therefore to ensure, in the assemblies of bicycle components in mutual rotation, a high smoothness capability for an extended time period.

The present invention therefore relates, in a first aspect thereof, to an assembly of bicycle components in mutual rotation, comprising a support element, a rotary element rotatably coupled with the support element, at least one bearing arranged between the support element and the rotary element, said at least one bearing comprising a first bearing element firmly coupled with one element from said support element and said rotary element, characterised in that said first bearing element and said one element from said support element and said rotary element have, at respective mutually coupled interface surfaces, a standard reduction potential difference lower than or equal to 0.3 V, in absolute value.

Throughout the present description and in the subsequent claims, the expression "firmly coupled", is used to indicate a coupling without relative motion between the two coupled elements.

Throughout the present description and in the subsequent claims, the expression "bearing" is used to indicate any member intended to be arranged between a first bicycle element and a second bicycle element to allow the relative rotation of one element with respect to the other element. Such a member can have the classic configuration of a rolling bearing, with two rings and a plurality of rolling elements arranged between the two rings, or a similar configuration, in which for example one of the rings is omitted and the race for the rolling elements is defined directly on one of the two bicycle elements in mutual rotation.

Throughout the present description and in the subsequent claims, the expression "standard reduction potential value", is used to indicate the value of the electrode potential referring to the standard hydrogen electrode and measured at the following standard conditions: temperature 298 K, pressure 1 atm, concentration of the participants in the reaction of 1 M.

SUMMARY

The Applicant has carefully studied the coupling between the two bicycle components in mutual rotation at the coupling interface between one of the two bicycle components and the bearing element fixedly coupled with it and has surprisingly noted that such a coupling, which apparently should not be responsible for smoothness capability since it is defined between elements fixed to one another, i.e. without relative motion, in reality has a direct influence upon such smoothness capability. The Applicant has indeed found that the aforementioned coupling between elements fixed to one another is subjected over time to phenomena of corrosion that alter the coupling conditions between the two fixedly coupled elements and, therefore, between the two bicycle components in mutual rotation. In particular, the Applicant has found that the aforementioned corrosion causes a movement of the bearing element with respect to the bicycle element with which it is fixedly coupled, consequently altering its interaction with the other elements of the assembly. The Applicant has for example noted how the phenomena of corrosion described above have a particularly negative effect in the case of use of ball bearings, where perfect adjustment of the mounting position of each element of the bearing and of the relative preloading is required.

Moreover, the Applicant has noted how, even in the case in which a protective system is used to prevent corrosion from directly attacking the elements in mutual rotation, like grease and protective screens, the corrosion at the coupling between firmly coupled elements propagates up to the interface with the mobile elements directly responsible for smoothness capability, so that smoothness capability in any case decreases and, in the worst cases, becomes zero.

The Applicant has noted for example how, again in the case of use of ball bearings, corrosion can occur at the interface between a ring of the bearing and the bicycle element with which such a ring is firmly coupled to then propagate inside the bearing until it reaches the ball races, in this way altering the correct position of the balls.

The Applicant has observed in particular that the galvanic corrosion is mainly liable for the occurrence of corrosion at the interface between the firmly coupled elements of the assembly. This corrosion occurs due to the effect of the action of atmospheric and/or polluting agents present in the environment in which such an assembly operates.

Throughout the present description and in the subsequent claims, "galvanic corrosion" is used to indicate the corrosion that occurs between two surfaces in contact with one another situated in an aggressive environment. In these circumstances, one of the two surfaces behaves like a cathode and the other surface behaves like an anode. Typically, the ion exchange between these surfaces causes that the anode corrodes much faster than the cathode.

Advantageously, the Applicant has found that by selecting the material of the aforementioned interface surfaces so as to have a standard potential difference equal to or lower than the threshold of 0.3 V it is made more difficult for corrosion to occur at such interface surfaces and its propagation inside the assembly is hindered, basically achieving a satisfactory extension of the useful life of the assembly.

Preferably, the aforementioned standard reduction potential difference is lower than or equal to 0.2 V, in absolute value, the extremes being included.

More preferably, the aforementioned interface surfaces have respective standard reduction potential values selected within the range between +0.4 V and −0.05 V.

Preferably, at least one from said first bearing element and said one element from said support element and said rotary element has, at the respective interface surface, a standard reduction potential comprised between 0.16 and 0.18 V, the extremes being included. The Applicant has noted that the extension of the useful life of the assembly is particularly significant if the material of at least one of the aforementioned interface surfaces is selected so as to have a standard reduction potential within the aforementioned range of values.

In a preferred embodiment of the assembly of the present invention, the interface surface of said first bearing element is made from stainless steel. Preferably the aforementioned steel is of the martensitic type, and more preferably it is X20Cr13.

Preferably, the interface surface of said one element from said support element and said rotary element is made from a material selected from: stainless steel, aluminum alloy treated with anodic oxidation, metallic material coated with chemical nickel, composite material comprising a filler incorporated in a matrix of polymeric material, such a filler being coated with an insulating surface layer, for example polymeric material the same as, or different to, that of the matrix.

Preferably, the aforementioned filler comprises structural fibres selected from the group consisting of carbon fibres, glass fibres, aramid fibres, ceramic fibres, boron fibres and combinations thereof, carbon fibres being particularly preferred.

Preferably, the aforementioned filler comprises structural fibres selected from the group consisting of carbon fibres, glass fibres, aramid fibres, ceramic fibres, boron fibres and combinations thereof, carbon fibres being particularly preferred.

Preferably, the polymeric material is a thermosetting material and more preferably comprises an epoxy resin. However, the possibility of using a thermoplastic material is not excluded.

In the preferred embodiment of the assembly of the present invention, the aforementioned bearing also comprises a second bearing element rotatably coupled with said first bearing element, said first bearing element being firmly coupled with said rotary element and said second bearing element being firmly coupled with said support element.

The second bearing element and said support element have respective mutually coupled interface surfaces. Preferably, the material of the interface surface of the second bearing element is identical to that of the interface surface of the aforementioned first bearing element, but the use of a different material is not excluded.

Preferably, therefore, the second bearing element and said support element also have, at the respective interface surfaces, a standard reduction potential difference lower than or equal to 0.3 V, in absolute value, more preferably lower than or equal to 0.2 V, in absolute value, the, extremes being included.

Moreover, preferably, the aforementioned interface surfaces have respective standard reduction potential values selected within the range between +0.4 V and −0.05 V.

More preferably, at least one from said second bearing element and said support element has, at the respective interface surface, a standard reduction potential comprised between 0.16 and 0.18 V, the extremes being included.

In the preferred embodiment of the assembly of the present invention, the interface surface of said second bearing element is made from stainless steel.

Preferably, the interface surface of said support element is made from a material selected from: stainless steel, aluminum alloy treated with anodic oxidation, metallic material coated with chemical nickel, composite material comprising a filler incorporated in a matrix of polymeric material, such a filler being coated with an insulating surface layer, for example polymeric material the same as, or different to, that of the matrix.

Preferably, the aforementioned filler also in this case comprises structural fibres selected from the group consisting of carbon fibres, glass fibres, aramid fibres, ceramic fibres, boron fibres and combinations thereof, carbon fibres being particularly preferred.

Preferably, the polymeric material also in this case is a thermosetting material and more preferably comprises an epoxy resin. However, the possibility of using a thermoplastic material is not excluded.

In a particularly preferred embodiment of the assembly of the present invention, said first and second bearing elements comprise respective rings and said bearing comprises a plurality of rolling elements arranged between said rings.

Preferably, said rolling elements are made from ceramic material. Advantageously, the ceramic materials are electrically inert, for which reason corrosion is prevented from starting inside the bearing.

More preferably, the ceramic material used has a density lower than or equal to that of steel, even more preferably lower than or equal to 5 gr/cm3. In this way an advantageous reduction in weight is achieved compared to conventional rolling elements made from steel.

Preferably, the rolling bearing with ceramic rolling elements has no lubricants, so as to increase the smoothness capability compared to conventional systems in which lubricants are used.

The Applicant has indeed observed that, in conventional systems in which ball bearings are used on which grease is applied, part of the desired smoothness capability is sacrificed, due to the viscous friction generated by such grease. Moreover, the use of protective screens causes a further reduction in the desired smoothness capability, due to the sliding friction between such screens and the elements in rotation. Advantageously therefore, the absence of lubricants in the assembly of the present invention implies an increase in smoothness capability. Moreover, with the assembly of the present invention it is no longer necessary to carry out periodic maintenance of the rotary parts of the assembly to refill or replace the amount of lubricant when it is saturated with corrosive agents coming from the environment in which the assembly operates. Such an advantage is particularly important given that the maintenance interventions require experience not possessed by a large number of cyclists.

The assembly of the present invention is preferably a bottom bracket assembly, or a hub assembly, or a steering assembly of a bicycle.

In a second aspect thereof, the present invention relates to a bicycle comprising at least one assembly of the type described above.

Preferably, such a bicycle has, individually or in combination, all of the structural and functional characteristics discussed above with reference to the assembly of the present invention and therefore it has all of the aforementioned advantages.

BRIEF DESCRIPTION OF THE DRAWINGS

Further characteristics and advantages of the present invention shall become clearer from some preferred embodiments thereof, made with reference to the attached drawings and given for indicating and not limiting purposes. In such drawings.

DETAILED DESCRIPTION OF THE PREFERRED EMBODIMENTS

Figure 1:
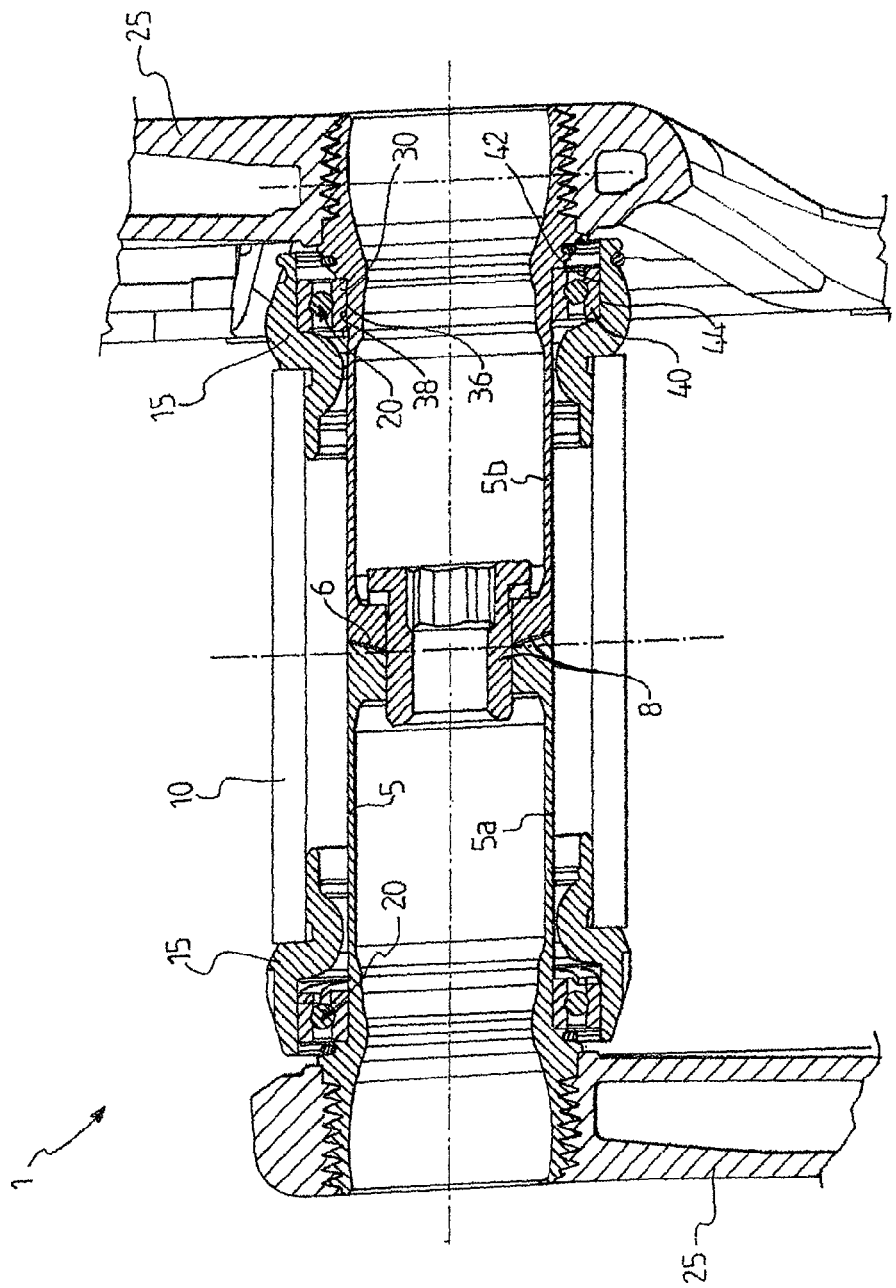
FIG. 1 is a longitudinal section view of a bottom bracket assembly according to the present invention.

With reference to FIG. 1 a first example of an assembly of bicycle components provided with mutual rotary motion is illustrated. In particular, it relates to a bottom bracket assembly, wholly indicated with 1.

The assembly 1 comprises a shaft 5 supported in rotation in the housing box 10 of a bicycle frame. The assembly 1 also comprises a pair of adapters 15 screwed onto the opposite ends of the box 10 and a ball bearing 20 arranged between each adapter 15 and the respective end of the shaft 5.

In the example illustrated in FIG. 1, the adapters 15 acts as a support element for the shaft 5, such a shaft being, on the other hand, the rotary element of the assembly 1.

The man skilled in the art shall have no difficulty in understanding that what will be stated hereafter is equally applicable to alternative embodiments to the one illustrated in FIG. 1, in which for example adapters 15 are not used and/or in which a type of bearings different to the ball bearing 20 illustrated and described are used.

In the specific embodiment of the bottom bracket assembly 1 illustrated in FIG. 1, the shaft 5 is defined by two shaft elements 5a and 5b connected to each other through a front toothing 6 of the Hirth type and a locking screw 8. Each shaft element 5a, 5b is in turn coupled, at the opposite end thereof to the one where the Hirth toothing is provided, with a respective crank arm 25 through screwing.

Also in this case, the man skilled in the art will have no difficulty in understanding that what shall be stated hereafter is equally applicable to alternative embodiments to the one illustrated in FIG. 1, in which for example the shaft 5 is in a single piece, or in which one or both of the crank arms are made in one piece with a respective shaft element, or in which the coupling of the crank arms with the shaft or with the half-shaft takes place in a different way, for example by interference or through grooved surfaces.

Figure 2:
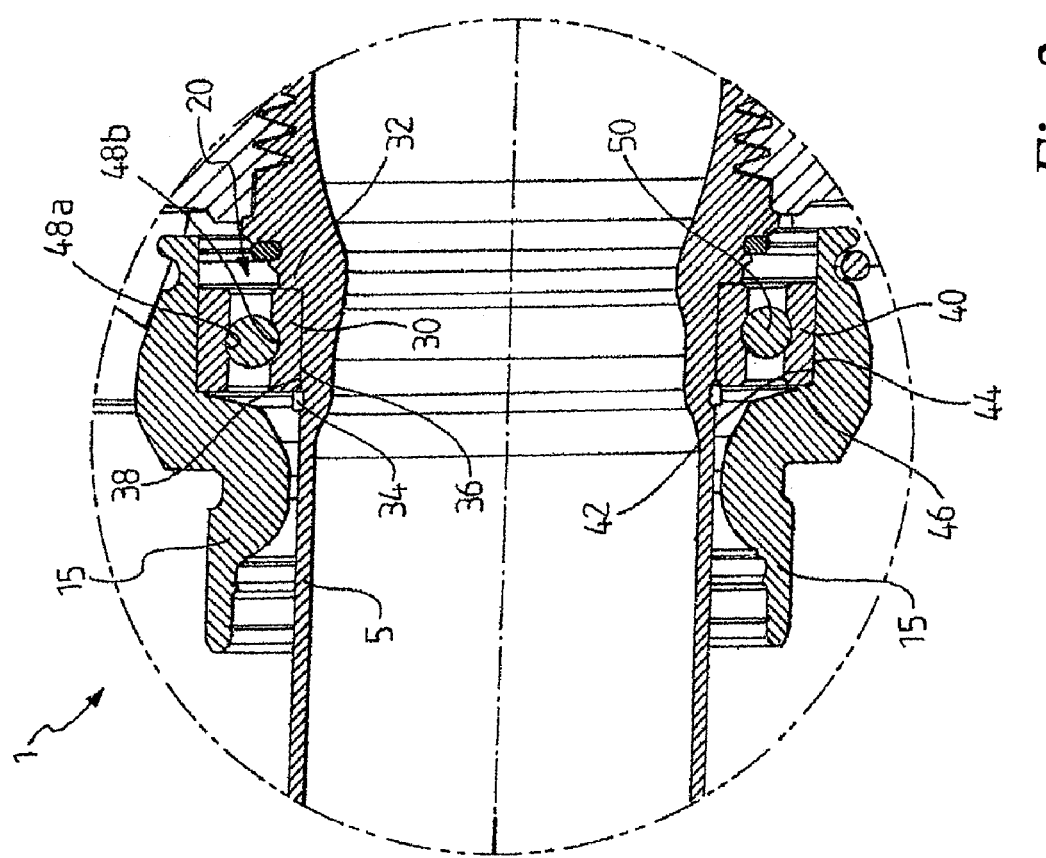
FIG. 2 is an enlarged view of a detail of the assembly of FIG. 1.

As better illustrated in FIG. 2, the element of the ball bearing 20 that is firmly coupled with the shaft 5 is the inner ring 30 of the bearing. Such a coupling can be made with any known system, like a forced coupling, and/or with abutment shoulders 32 formed on the shaft 5 and stop elements 34 applied to the shaft 5 on the opposite side to the shoulders 32 with respect to the bearings 20.

As better illustrated in FIG. 2, the inner ring 30 and the shaft 5 have respective interface surfaces 36 and 38 at which they are coupled together.

The materials from which the interface surface 36 of the inner ring 30 of the bearing and the interface surface 38 of the shaft 5 are made have a high resistance to corrosion, preferably to galvanic corrosion.

Preferably, the entire inner ring 30 is made from the same material as the interface surface 36 thereof. Similarly, the entire shaft 5 is made from the same material as the interface surface 38 thereof.

The standard reduction potential difference between the materials of the interface surfaces 36 and 38 has an absolute value lower than or equal to 0.3 V. It should be understood that the standard reduction potential difference is the one between the materials in direct contact with each other, for which reason if one of the two contact elements has a surface oxidation or coating layer, it is necessary to consider the standard reduction potential values of such a layer. The thickness of the oxidation or coating layer is preferably comprised between 1 and 40 micron, the extremes being included.

Preferably, the materials of the interface surfaces 36 and 38 are selected so that the respective standard reduction potential values fall within the range between +0.4 V and −0.05 V, with an absolute value of the standard reduction potential difference lower than or preferably equal to 0.2 V. In particular, the interface surface 36 of the ring 30 preferably has a standard reduction potential value comprised between 0.16 and 0.18 V, the extremes being included, for which reason the interface surface 38 of the shaft 5 preferably has a standard reduction potential value of between −0.04 and +0.38 V, the extremes being included.

Examples of materials for the interface surface 36 of the inner ring 30 and for the interface surface 38 of the shaft 5 are stainless steel (preferably martensitic, preferably X20Cr13) for the interface surface 36 of the inner ring 30 and, for the interface surface 38 of the shaft 5, one of the following materials:

stainless steel (preferably martensitic—preferably AISI 630);

aluminum alloys treated with anodic oxidation;

metallic material with a coating of chemical nickel;

composite material comprising a filler incorporated in a matrix of polymeric material, in which the filler is coated with an insulating surface layer, for example polymeric material the same as or different to the matrix.

By composite material we mean a material comprising at least two components including a polymeric matrix and a filler.

Preferably, the aforementioned composite material is a structural composite material, but alternatively it can be a reinforced composite material.

By structural composite materials we mean those materials that contain structural fibres with a length of over five millimetres, whereas by reinforced composite materials we mean those materials comprising a polymeric matrix filled with fibres of a length lower than or equal to five millimetres and/or with powders and/or granules. The sizes mentioned above refer to the length of the fibre that can be found in a finished piece.

Preferably, in the case in which in the assembly of the present invention a composite material is used, such a material is a structural composite material.

However, the use of a reinforced composite material is not excluded.

The structural fibres are preferably selected from the group consisting of carbon fibres, glass fibres, aramid fibres, ceramic fibres, boron fibres and combinations thereof. Carbon fibres are particularly preferred.

The arrangement of the structural fibres in the polymeric material can be a random arrangement of pieces or sheets of structural fibres, a substantially unidirectional ordered arrangement of fibres, a substantially bidirectional ordered arrangement of fibres, or a combination of the above.

The polymeric material is preferably thermosetting and preferably comprises an epoxy resin. However, the possibility of using a thermoplastic material is not excluded.

What has been stated above for the inner ring 30, the shaft 5 and their mutual coupling is valid in a mirror-like way for the outer ring 40 of the bearing 20, the adapter 15 and their mutual coupling. In particular, the outer ring 40 and the adapter 15 have respective interface surfaces 42 and 44 made from materials having a high resistance to corrosion, preferably to galvanic corrosion.

Preferably, such materials have an absolute value of the standard reduction potential difference lower than or equal to 0.3 V, more preferably lower than or equal to 0.2 V. In particular, the interface surface 42 of the outer ring 40 preferably has a standard reduction potential comprised between 0.16 and 0.18 V, the extremes being included. Even more preferably, the interface surface 42 of the outer ring 40 is made from the same material as the interface surface 36 of the inner ring 30, whereas the interface surface 44 of the adapter 15 is made from one of the materials indicated above for the interface surface 38 of the shaft 5.

Preferably, the entire outer ring 40 is made from the same material as the interface surface 42 thereof. Similarly, the entire adapter 15 is made from the same material as the interface surface 44 thereof.

The outer ring 40 is firmly coupled with the adapter 15 thanks to the preloading exerted by the screw 8 (FIG. 1), through which it is pushed into abutment against a shoulder 46 formed in the adapter 15.

The rings 30 and 40 each comprise a rolling race 48a and 48b for a number of balls 50.

The balls are preferably made from ceramic material. Examples of suitable ceramic materials are silicon nitride and alumina. Preferably, such a ceramic material has a density lower than or equal to that of steel, more preferably lower than or equal to 5 gr/cm3.

Figure 3:
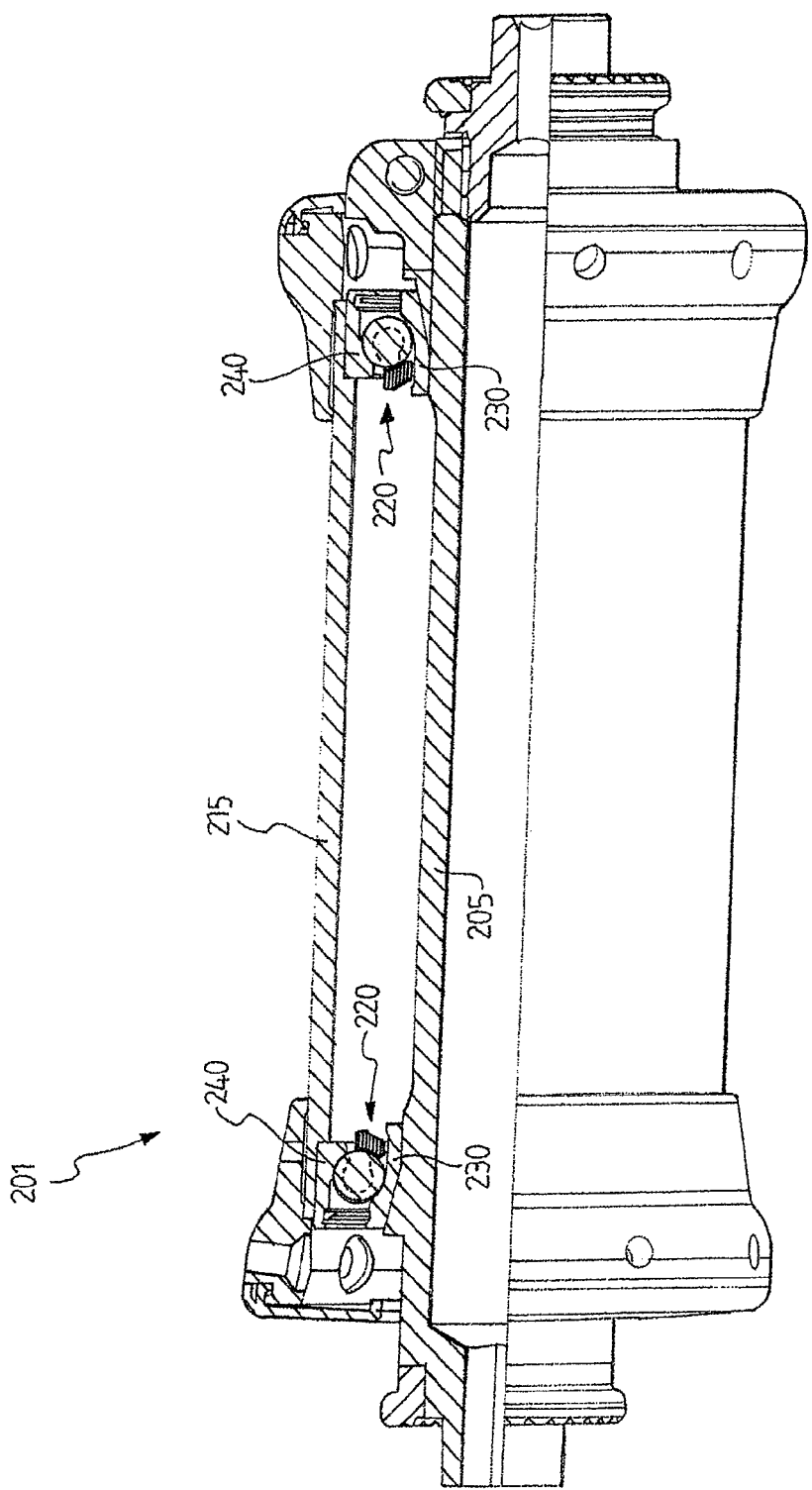
FIG. 3 is a longitudinal section view of a bicycle hub according to the present invention.

FIG. 3 illustrates a second example of an assembly of bicycle components equipped with mutual rotary motion, in accordance with the present invention. In particular, it relates to a hub assembly, wholly indicated with 201.

The assembly 201 comprises a shaft 205, an outer shell 215 and bearings 220. The shaft 205, which is intended to remain fixed with respect to the frame of a bicycle, in this case acts as a support element, whereas the shell 215, intended to rotate with respect to the shaft 205, acts as an element supported in rotation through the interposition of the bearings 220.

Although the arrangement of the support element 205 and of the rotary element 215 are inverted here with respect to the bottom bracket assembly 1 described above, the couplings of the rings 230 and 240 with these elements have the same characteristics as those described above.

Figure 4:
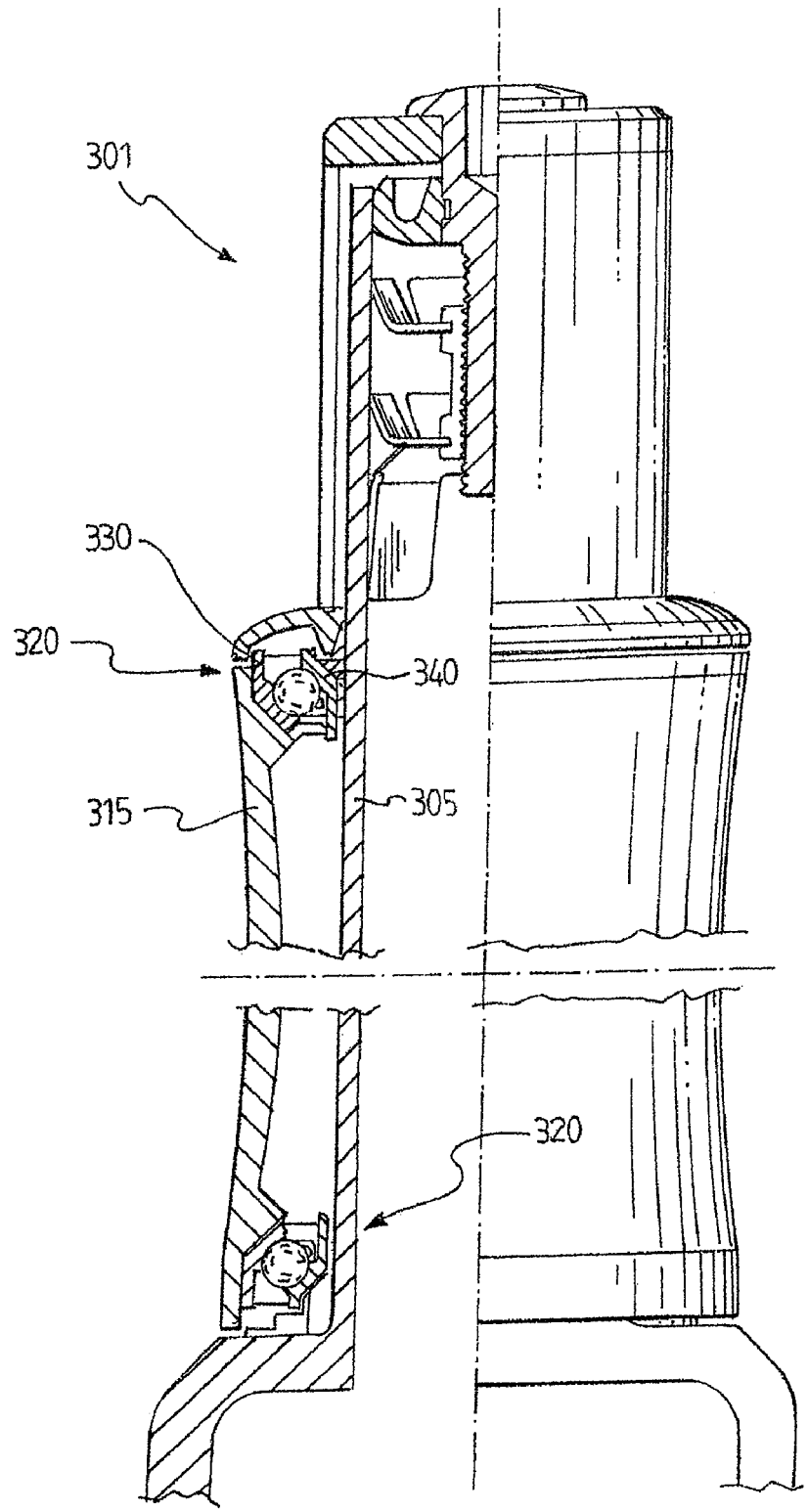
FIG. 4 is a longitudinal section view of a steering assembly according to the present invention.

FIG. 4 illustrates a third example of an assembly of bicycle components equipped with mutual rotary motion, in accordance with the present invention. In particular it relates to a steering assembly, wholly indicated with 301.

The assembly 301 comprises a steering tube 305 rotatably coupled with a steering column 315 of the frame of a bicycle through the interposition of a pair of bearings 320 provided with rings 330, 340. In this case the support element is the column 315, whereas the rotary element is the steering tube 305. The coupling between the bearings 320 and the column 315 is a direct contact coupling, for which reason it preferably has the properties of standard reduction potential difference described above.

Just ball bearings have been described above. However, any type of bearing can be used, like for example a bearing with different shaped rolling elements, like rollers, or more generally members shaped in a similar way to rolling bearings.

Preferably, when the bearing is provided with rolling elements, with rings made from stainless steel and rolling elements made from ceramic material, no lubricant in used in the bearing.

Of course, a man skilled in the art can bring numerous modifications to the assembly described above, in order to satisfy specific and contingent requirements, all of which are in any case within the scope of protection of the present invention as defined by the following claims.

What is claimed is:

1. An assembly of bicycle components in mutual rotation, comprising a support element, a rotary element rotatably coupled with the support element, at least one bearing arranged between the support element and the rotary element, the at least one bearing comprising a first bearing element firmly coupled with one of the support element or the rotary element, wherein the first bearing element and the one of the support element or the rotary element have, at respective mutually coupled interface surfaces, a standard reduction potential difference less than or equal to 0.3 V, in absolute value.

2. The assembly of claim 1, wherein the standard reduction potential difference is less than or equal to 0.2 V, absolute value.

3. The assembly of claim 1, wherein the interface surfaces have respective standard reduction potential values selected within the range of +0.4 V and −0.05 V.

4. The assembly of claim 3, wherein at least one of the first bearing element and the one of the support element or the rotary element has, at the respective interface surface, a standard reduction potential comprised between 0.16 and 0.18 V, extremes being included.

5. The assembly of claim 1, wherein the interface surface of the first bearing element is made from stainless steel.

6. The assembly of claim 1, wherein the interface surface of the one of the support element or the rotary element is made from a material selected from the group consisting of: stainless steel, aluminum alloy treated with anodic oxidation, metallic material coated with chemical nickel, and composite material having a filler incorporated in a matrix of polymeric material, wherein the filler is coated with an insulating surface layer.

7. The assembly of claim 1, wherein the bearing comprises a second bearing element rotatably coupled with the first bearing element, the first bearing element is firmly coupled with the rotary element, and the second bearing element is firmly coupled with the support element.

8. The assembly of claim 7, wherein the second bearing element and the support element comprise respective mutually coupled interface surfaces, at which there is a standard reduction potential difference less than or equal to 0.3 V, absolute value.

9. The assembly of claim 8, wherein at least one of the second bearing element and the support element has, at the respective interface surface, a standard reduction potential between 0.16 and 0.18 V, extremes being included.

10. The assembly of claim 7, wherein the second bearing element and the support element comprise respective mutually coupled interface surfaces and wherein the interface surface of the second bearing element is made from stainless steel.

11. The assembly of claim 7, wherein the second bearing element and the support element comprise respective mutually coupled interface surfaces and wherein the interface surface of the support element is made from a material selected from the group consisting of: stainless steel, aluminum alloy treated with anodic oxidation, metallic material coated with chemical nickel, composite material having a filler incorporated in a matrix of polymeric material, wherein the filler is coated with an insulating surface layer.

12. The assembly of claim 7, wherein the first and second bearing elements comprise respective rings, and the bearing also comprising a plurality of rolling elements arranged between the rings.

13. The assembly of claim 12, wherein the rolling elements are made from ceramic material.

14. The assembly of claim 13, wherein the ceramic material has a density less than or equal to that of steel.

15. The assembly of claim 12, wherein no lubricants are provided in the bearing.

16. The assembly of claim 1, wherein the assembly is an assembly selected from the group consisting of: a bottom bracket assembly, a hub assembly, or a steering assembly.

17. Bicycle comprising at least one assembly of bicycle components in mutual rotation, comprising a support element, a rotary element rotatably coupled with the support element, at least one bearing arranged between the support element and the rotary element, the at least one bearing comprising a first bearing element firmly coupled with one of the support element or the rotary element, wherein the first bearing element and the one of the support element or the rotary element have, at respective mutually coupled interface surfaces, a standard reduction potential difference less than or equal to 0.3 V, in absolute value.

18. A coupling between members of a bicycle assembly, comprising:
   a fixed member;
   a rotational member coupled to the fixed member through the interposition of at least one bearing;
   wherein, at least one bearing surface is firmly coupled to at least one member surface of at least one of the fixed member or the rotational member, and the at least one bearing surface and the at least one member surface have a maximum standard reduction potential difference of 0.3 V.

19. The coupling of claim 18 comprising first and second bearing surfaces firmly coupled to first and second member surfaces of each of the fixed member and the rotational member.

20. The coupling of claim 18 wherein the fixed member is positioned radially inward with respect to the rotational member.

* * * * *